2,729,658

POLYMERIZATION PROCESS USING BORON FLUORIDE

Clarence B. Croston, Howard M. Teeter, and John C. Cowan, Peoria, Ill., assignors to the United States of America as represented by the Secretary of Agriculture No Drawing. Application December 17, 1951, Serial No. 262,164

1 Claim. (Cl. 260—407)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of polymeric fatty acids and their lower alkyl esters, and to the production of crude polymerization mixtures containing the same. More particularly, the invention relates to the polymerization of long-chain, unsaturated fatty acids, such as those derived from drying or semi-drying glyceride oils like soybean oil, corn oil, perilla oil, sunflower seed oil, peanut oil, linseed oil, tung oil, and the like.

It is known that glyceride oils of the type mentioned may be polymerized by heating with or without the assistance of polymerization agents. In each case, the polymerization involves relatively high temperatures. These polymerized oils may be used as a source for polymerized fat acids. In general, however, the yields are low.

Boron trifluoride has been employed as a condensation agent for polymerizing glyceride oils, but the resulting products are dark in color, and special precautions must be taken to avoid gelling the oil. It has been necessary to conduct the oil polymerization at temperatures below 120° C., and prior workers have suggested −15° C. or even −25° C. or lower as advisable polymerization temperatures.

This invention is based upon the discovery that the catalytic effect of boron trifluoride, when used as a condensation agent for polymerizing unsaturated fatty acids, is in sharp contrast to the effect it exhibits when employed with glyceride oils. For example, the polymerization is advantageously carried out at temperatures above 140° C., and the product is characterized by high yield, minimum decrease in acid number, and absence of any tendency to form cross-linked gels even after continued polymerization.

The polymerized products of our invention have distinctive characteristics which render them particularly valuable for many industrial purposes. They are characterized by a relatively low ratio of dimer to trimer. In addition to the established uses of polymeric fatty acids and their esters, the products of this invention have been found particularly useful as additives in road oil compositions. Of particular practical and economic importance is the fact that the crude polymerizates may be used for this purpose.

According to the invention, a fatty acid material, preferably derived from a drying or semi-drying glyceride oil, such as soybean oil, corn oil, perilla oil, sunflower seed oil, peanut oil, linseed oil, tung oil, and the like, and selected from the group consisting of long-chain, unsaturated, aliphatic carboxylic acids, such as oleic acid, linoleic acid, linolenic acid, eleostearic acid, and the like, and mixtures of such acids, is subjected to the action of boron trifluoride in an amount of from 0.1 percent to 6 percent based on the weight of the fatty acid material, at a temperature of from 140° C. to 250° C. until polymerization is effected, which occurs in a period of from 1 to 5 hours.

The boron trifluoride may be added to the fatty acid material in any convenient manner, as for example, by direct solution in the cold material or by bubbling through the heated material during the actual polymerization. It may or may not be added in conjunction with an inert gas, such as nitrogen or carbon dioxide. The material and catalyst are then heated in an open or closed reaction zone to a temperature as hereinbefore described, until the desired degree of polymerization is effected, which occurs in a period of from 1 to 5 hours.

Instead of using boron trifluoride per se, we may also use boron trifluoride complexes with oxygenated compounds, such as ethers and the like.

The polymerizate may be subjected to known separatory methods for recovering the polymers, as for example, by low pressure distillation. However, as previously stated, the whole polymerizate may be employed for many useful purposes.

The following examples illustrate the invention, parts being by weight unless otherwise specified.

*Example 1*

The free fatty acids of soybean oil (acid number 190) were treated in open flasks with 4 parts of boron trifluoride per 100 parts of acids. One flask was maintained at 30° C. for five hours, and another maintained at 160° C. for two hours. At the end of the reaction time the polymerizates were subject to low pressure distillation to remove the unreacted monomeric acids, thus isolating the residual polymers.

| Run No. | Temp. of Polymerization, °C. | Yield of Polymer, Percent | Refractive Index (30°) | Acid Number | Viscosity (Gardner) |
|---|---|---|---|---|---|
| 1 | 30 | 39 | 1.4742 | 93 | R |
| 2 | 160 | 71 | 1.4933 | 150 | Z-6 |

The solubility at room temperature in light mineral oil for the product of Run No. 1 was considerably more than 33⅓ percent, whereas the product of Run No. 2 was less than 5 percent soluble in the same solvent.

This example illustrates the critical difference in polymer product, both as to yield and as to character of polymer, which are brought about by employing our polymerization temperatures. The product of Run No. 2, although extremely viscous, showed no evidence of the formation of cross-linked gel.

*Example 2*

Free fatty acids of soybean oil, having an acid number of 171, were treated in an open flask with 4 parts of boron trifluoride per 100 parts of the fatty acids. The temperature of the reaction mixture was maintained at 200° C. for 2 hrs., after which the action was stopped, and the catalyst removed. The product had a refractive index (30° C.) of 1.488 and an acid number of 166.

The crude polymerizate of this example was tested as an additive in asphalt road compositions to determine its effect on the coating properties of a cut-back cracked residuum. Fifty grams of a mineral aggregate, such as 20 or 30 mesh sand, was covered with water and the excess drawn off. Two grams of the bitumen material was then added to the wet aggregate and the mixture stirred for about 1 minute. The coating was then observed visually to note whether the aggregate was adequately coated. The coated mass was then submerged in water, and the extent of stripping was evidenced by the amount of material leaving the aggregate and floating on the surface of the water. The product of this example, when added in the proportion of 1 percent of the bitumen material, resulted in very good coating of the aggregate accompanied by only a small degree of stripping.

By way of comparison, when oleic acid is added in the proportion of 2 percent of the bitumen material, the coating was rated only fair, and the stripping was extensive to complete.

*Example 3*

Free fatty acids of soybean oil, having an acid number of 156, were treated in an open flask with 4 parts of boron trifluoride per 100 parts of fatty acids. As in Example 2 the reaction mixture was maintained at 200° C. for 2 hrs. The unpolymerized material was removed from the reaction product, giving a 72 percent yield of polymerizate. The polymerizate had a refractive index (30° C.) of 1.493, and an acid number of 122.

The polymerizate, freed from unpolymerized material as described above, was esterified with methyl alcohol to produce the corresponding polymerized methyl esters. These esters were then subjected to a short path distillation in an alembic flask to effect separation of the dimer esters from the higher polymers. After the distillation, the ratio of dimer to higher polymer was found to be 0.24.

The foregoing examples illustrate the invention when employing the mixed fatty acids obtainable from a glyceride oil. In place of the mixed acids used in these examples, we may substitute the individual acids, such as those obtainable by fractionating the mixed acids.

We claim:

A process comprising subjecting a fatty acid material selected from the group consisting of long-chain, unsaturated, aliphatic carboxylic acids, and mixtures of such acids, to the action of boron trifluoride at a temperature of about from 140° C. to 250° C. until polymerization is effected, said boron trifluoride being present in an amount of from 0.1 percent to 6 percent based on the weight of the fatty acid material, separating boron trifluoride from the reaction mixture, and subsequently separating unpolymerized material from the reaction product by distillation.

References Cited in the file of this patent

UNITED STATES PATENTS

| | | |
|---|---|---|
| 2,260,417 | Whiteley | Oct. 28, 1941 |
| 2,365,919 | Uloth | Dec. 26, 1944 |